(12) United States Patent
Ahm

(10) Patent No.: US 7,356,964 B2
(45) Date of Patent: Apr. 15, 2008

(54) SEED TAPE INCLUDING SUCCESSIVELY ARRANGED GERMINATING UNITS AS WELL AS A METHOD OF GERMINATING THE SEED TAPE

(75) Inventor: Poul Henrik Ahm, Altea (ES)

(73) Assignee: Bentle Products AG, Baar (CH)

( * ) Notice: Subject to any disclaimer, the term of this patent is extended or adjusted under 35 U.S.C. 154(b) by 10 days.

(21) Appl. No.: 10/529,423

(22) PCT Filed: Sep. 25, 2002

(86) PCT No.: PCT/DK02/00632

§ 371 (c)(1),
(2), (4) Date: Mar. 25, 2005

(87) PCT Pub. No.: WO2004/028237

PCT Pub. Date: Apr. 8, 2004

(65) Prior Publication Data

US 2006/0162248 A1    Jul. 27, 2006

(51) Int. Cl.
*A01C 1/04*    (2006.01)
(52) U.S. Cl. .......................................................... 47/56
(58) Field of Classification Search ............. 47/9, 47/14, 15, 56
See application file for complete search history.

(56) References Cited

U.S. PATENT DOCUMENTS

| 2,281,927 | A | * | 5/1942 | Fischer | 47/56 |
|---|---|---|---|---|---|
| 2,812,618 | A | * | 11/1957 | Weston | 47/56 |
| 4,866,879 | A | * | 9/1989 | Wood et al. | 47/56 |
| 5,934,011 | A | * | 8/1999 | Ishioka et al. | 47/56 |
| 6,164,011 | A | * | 12/2000 | Gaudreault et al. | 47/9 |
| 6,578,317 | B1 | * | 6/2003 | Ahm | 47/56 |
| 6,701,664 | B2 | * | 3/2004 | Ahm | 47/56 |
| 6,735,902 | B1 | * | 5/2004 | Ahm | 47/56 |
| 2006/0156623 | A1 | * | 7/2006 | Ahm | 47/56 |

FOREIGN PATENT DOCUMENTS

| DE | 19503971 | * | 8/1996 |
|---|---|---|---|
| DE | 19503971 A1 | * | 8/1996 |
| GB | 2191925 A | * | 12/1987 |

* cited by examiner

Primary Examiner—Francis T. Palo
(74) Attorney, Agent, or Firm—Cooper & Dunham LLP

(57) ABSTRACT

A seed tape including successively arranged germinating units (1a, 1b, 1c) is made of at least one carrier strip (2) as well as at least one layer (3) of biodegradable, gas-permeable material placed on said carrier strip. Each germinating unit (1a, 1b, 1c) includes a mixture of carrier (7), at least one additive (8) and optionally an adjuvant(s) (9) in addition to one or more seeds (10). The layer (3) of biodegradable, gas-permeable material is flexible and non-woven. The additive or additives (8) are water-absorbing. In this manner the seed tape is particularly suited for being subjected to a pregermination procedure because it possesses a very high capacity of retaining water without disintegrating.

16 Claims, 4 Drawing Sheets

SEED TAPE INCLUDING SUCCESSIVELY ARRANGED GERMINATING UNITS AS WELL AS A METHOD OF GERMINATING THE SEED TAPE

TECHNICAL FIELD

The invention relates to a seed tape as stated in the preamble of claim 1.

In this description the expression "carrier" should be understood so as to cover a material including at least one of the substances: granulated, expanded vermiculite, perlite, zeolite, cellulose materials, such as wood fibres and sphagnum burned clay, rock wool or the like substances.

Further the expression "adjuvant" should be understood so as to cover one or more substances selected among plant nutrients, plant protectants, such as pesticides, including herbicides, insecticides, especially systemic insecticides, fungicides, virae, cultures of bacteria, cultures of fungi, such as Trichoderma, fungus spores, microencapsulated fungicides, eggs from useful insects, such as predatory nematodes, fertilizers, enzymes, animal repellants, hormones, pH-adjusting agents, carbon, clay particles, trace elements, such as molybdenum, wood fibres or wood powder, kieselguhr, surfactants or other substances with a favourable effect on the germination and the growth of plants, where several substances are available in microencapsulated form.

By the expression "biodegradable material" is ment a material gradually disintegrating when left alone in its natural state so as to be part of the ordinary biological circuit.

BACKGROUND ART

One of the most vital conditions for a seed to start germinating is that the enzymes and hormones present in the seed coat are brought into contact with the germ and the white of the seed. This is supported by means of water. When a high number of seeds are moistened with water, the water with the dissolved enzymes and hormones reaches the white and the germ of the individual seeds at a time varying from seed to seed. Accordingly, these seeds start to germinate at various times. Such a developing period is not completely satisfying as nothing but an insignificant time delay with respect to the development of the individual germinating periods implies that the seeds develop into plants which at the harvesting present a rather significant difference in weight. The latter is very disadvantageous for the farmer who wants all plants to be equally developed at the harvesting in such a manner that he or she obtains the best possible yield on the field with the seeds sowed therein. In view of the above a demand applies for the seeds to be subjected to a pregermination procedure whereby additional water is fed in such a manner that all the seeds have developed equally with respect to germination when they are bedded out in the ground.

It is known to pellet seeds in order to provide the seeds with additional nutrition and protection. Frequently, the seed pill includes one or more layers of clay, and it is impossible to incorporate the water reserves necessary for the pregermination into such pills because the clay coat encircling the seeds disintegrates in connection with the feeding thereto of water.

From the International publication No WO 01/56361 A1 a seed tape is known including successively arranged germinating units. Said tape includes at least one carrier strip as well as at least one layer of biodegradable, gas-permeable material arranged on said carrier strip. Each germinating unit includes a mixture of carrier and at least one additive in addition to one or more seeds; the layer of biodegradable, gas-permeable material is flexible and non-woven. Said addition or additives is/are water absorbing.

BRIEF DESCRIPTION OF THE INVENTION

The object of the invention is to provide a seed tape of the above type which is suited for being subjected to a germination procedure as described above, and which at the pregermination procedure is particularly capable of retaining water without disintegrating.

The seed tape according to the invention is characterised in that the layer of biodegradable, gas-permeable material, which is flexible and non-woven, is made of polylactide (PLA) or a material including polylactide, or is made of rayon, viscose or polylactide plus starch. As a result, the germinating units are particularly capable of retaining the water amounts necessary for an optimum pregermination procedure. The latter is due to the fact that the materials of the germinating units encircling the seeds can act as a kind of "cocoons" which on the inner side can maintain an optimum moist microclimate around each seed after the watering. This microclimate can compensate for the air or the ground around or at a short distance from the seed tape optionally being less moist during a period. In other words, each "cocoon" provides a moisture buffer function. Even in the moist, viz. swollen, and optionally watered state, the germinating units tolerate considerable stress effects, such as in connection with a maximum bedding out without said germinating units breaking or being weakened and even though radicles or seed leaves should penetrate said germinating units. The flexible non-woven layer is particularly suited for carrying seeds, carrier and adjuvant. The carrier assists in preventing the necessary amount of air from being driven out of each "cocoon" in case of a prolonged uncontrolled supply of water from the surroundings. The biodegradability is very high as well.

The water-absorbing material may be cotton, preferably of a fibre diameter of 19 to 21 μm with the result that a long-term moist microclimate is obtained around each seed in an excellent manner, said climate enhancing the pregermination.

In addition, the PLA-fibres may according to the invention present a slightly creased structure.

Furthermore, the carrier strip may according to the invention be made of PLA, such as non-woven PLA.

According to the invention super absorbing polymer (SAP) grains or fibres may be arranged around and adjacent the seed, said SAP-grains or fibres being retained by means of an adhesive effect resulting from an ultrasound or heat treatment of the non-woven material. In this manner the seed tape is particularly resistant to disadvantageous stress effects from the outside.

In addition, the non-woven PLA-material may according to the invention present a needle structure and be structured as a sandwich with three crossed layers, where the middle layer includes relatively thin fibres and the two outer layers include fibres being somewhat thicker than the fibres of the middle layer. The resulting non-woven, PLA-layer can present a suitable gas-permeability.

According to the invention, the SAP-grains or fibres may be retained adjacent the seed by being glued onto the non-woven material by means of additional glue; preferably biodegradable natural glue, such as a starch, gelatine or sugar-based glue with the result that the grains or fibres are exceptionally well fastened to the non-woven material.

Furthermore, each germinating unit may according to the invention be delimited by two spaced transverse line weldings, whereby at least two relatively short auxiliary weldings maybe provided between these line weldings, said auxiliary weldings projecting inwards from each side edge of the seed tape and having a length of 0.05 to 0.20 times the width of the seed tape. As a result, the seed or seeds as well as the mixture of carrier, water-absorbing additive and optionally adjuvant are reliably retained in position inside the "cocoon". In addition, germ leaves and radicles can easily find a way into the ground, viz. between the auxiliary weldings.

According to the invention, the spot or line weldings may be provided at a temperature of 70 to 110° C. As a result, a suitable adhesiveness is obtained between the PLA and the paper, the seed and the water-absorbing additive, respectively.

According to the invention, the fibres of each non-woven layer may be of a length of 5 to 9 cm. These fibre proportions turned out to be particularly advantageous.

Moreover, the biodegradable, gas-permeable, flexible non-woven layer may according to the invention be formed by a row of pockets of non-woven polylactide (PLA) fastened to the carrier strip at an equidistant distance, and where each pocket includes a seed; this turned out to be particularly advantageous as well.

According to the invention the flexible woven PLA layer may preferably have a weight of 10 to 40 g/m$^2$.

Moreover, when the seeds are preferably sugar beet seeds, each germinating unit may according to the invention be delimited by a circumferential welded seam, which is locally interrupted in order to provide openings allowing radicles and seedlings to penetrate therethrough. This embodiment is particularly suited in connection with an accurate seeding.

Also, according to the invention, compressed small pieces may be produced by placing paper pulp, optionally cellulose fibres, SAP-crystals and grains of carrier and adjuvants, for instance on the surface of a suction cylinder by means of air. This provides a simple production of said pieces.

Moreover, adjuvants, such as pesticides, may according to the invention be available in a small capsule in each germinating unit, whereby a particularly easy administration of the pesticide is obtained.

According to the invention, the flexible non-woven PLA-layer may advantageously present a suction capacity of 0 to 30 mm, for instance 5 to 15 mm with the result that the PLA-layer can present a suitable wick effect.

According to the invention, the water-absorbing additive or additives, such as SAP and optionally adjuvants, such as pesticides, may be absorbed in or adhered to a blotting paper piece optionally provided with a plastic coating, such as a PLA coating, for a slow release of the additive and/or the adjuvant, said blotting paper piece being placed inside each germinating unit and for instance resulting from a cutting off from a high speed produced roll of blotting paper, such as at 500 m/min, where the above water-absorbing additive and adjuvant, if any, are sucked into or glued onto said blotting paper piece. In this manner the additive and the adjuvant, if any, can be administered in a very simple manner in each germinating unit because no more than one piece need be inserted in each germinating unit. These pieces are also cost-effective due to a very rational manufacture.

BRIEF DESCRIPTION OF THE DRAWING

The invention is explained in detail below with reference to the drawing, in which.

BEST MODE FOR CARRYING OUT THE INVENTION

Figure 1:
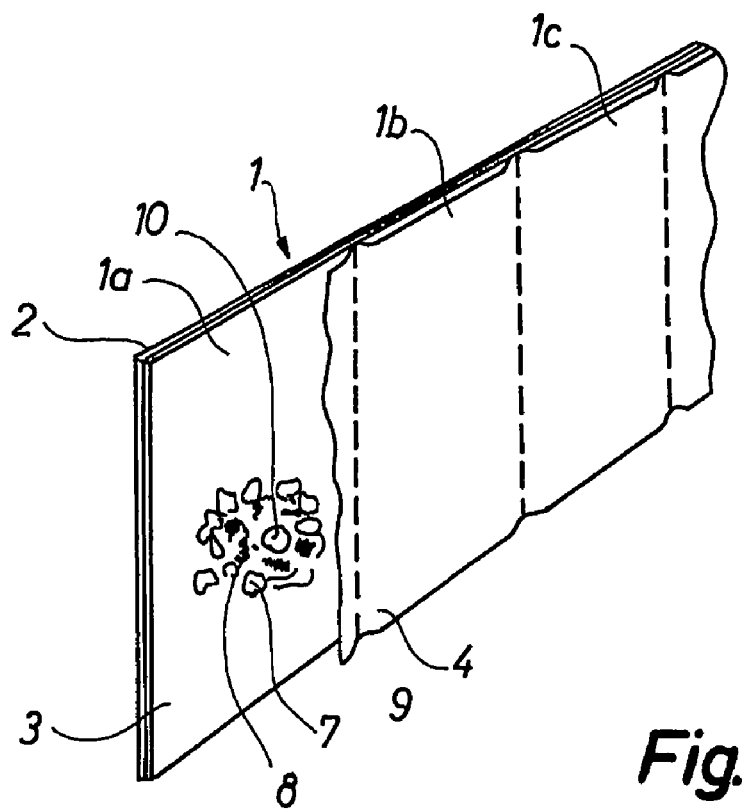
FIG. 1 is a perspective view of an embodiment of the seed tape according to the invention.

The seed tape of FIG. 1 includes many successively arranged germinating units, only three germinating units 1a, 1b og 1c being shown. The seed tape includes at least a biodegradable carrier strip 2 as well as at least one layer 3 of biodegradable gas-permeable material arranged on said strip. An additional carrier strip is indicated at 4. The layer 3 can be locally interrupted over a short distance along the seed tape, which, however, has not been illustrated. Each germinating unit 1a, 1b, 1c includes a mixture of carrier 7 and at least one water-absorbing additive 8 in addition to one or more seeds 10. One or more adjuvants 9 can also be present. Each carrier 7 and each adjuvant 9 includes at least one of the substances described above.

The water-absorbing additive or additives 8 can for instance be cotton, preferably a cotton of a fibre diameter of 19 to 21μ.

The layer 3 of biodegradable, gas-permeable material is flexible and non-woven. It can be hot-adhesive and for instance be made of polylactide (PLA) or a material containing said PLA or be made of rayon, viscose or polylactide plus starch. The layer 3 can be a non-woven material made of PLA-fibres with a slightly creased structure. The carrier strip 2 can be made of paper and preferably be of a weight of 14 to 60 g/m$^2$, preferably 22 g/m$^2$. However, the carrier strip can also be made of PLA, such as non-woven PLA.

The water-absorbing additive or additives 8 can be super-absorbing polymers (SAP) present in form of grains or fibres of an average weight of 0.05 to 0.42 mg/grain or fibre. In FIG. 1, these SAP-grains 8 have been illustrated in an exaggerated size for the sake of clarity of the Figure. The SAP-grains can for instance be cross-linked polyacrylic acid salts, cross-linked isobutylene-maleic acid-copolymer derivatives, salts of cross-linked starch-polyacrylic acid, salts of cross-linked polyvinyl-alcohol-polyacrylic acid, cross-linked polyvinylalcohol derivatives, cross-linked poly-ethylene-glycol derivatives and cross-linked carboxymethylcellulose derivatives.

The SAP-grains or fibres 8 can be of an average weight of 0.18 to 0.36 mg/grain or fibre, preferably approximately 0.27 mg/grain or fibre. It is also possible that the SAP-grains or fibres 8 are of an average size, viz. "diameter", of between 450 and 750μ, preferably between 550 and 650μ, especially approximately 600μ.

The SAP-grains or fibres 8 can be arranged around and adjacent the seed 10, said SAP-grains or fibres being retained by means of an adhesive effect resulting from an ultrasound or heat treatment of the PLA material.

The non-woven PLA-material 3 can present a needle structure and preferably be structured as a sandwich not shown with three crossed PLA-fibre layers, where the middle layer includes relatively thin fibres and the two outer layers include fibres being somewhat thicker than the fibres of the middle layer. The fibres of each layer are arbitrarily arranged relative to one another.

The SAP-grains or fibres 8 can be retained adjacent the seed by being glued onto the non-woven material 3 by means of additional glue. However, this glue does not appear from the Figure.

The glue can be a biodegradable natural glue, such as a starch, gelatine or sugar-based glue.

In FIG. 1, the strip 2 can for instance be kraft paper, whereas the layer 3 can be made of non-woven PLA as mentioned above, and a paper layer 4 can be placed on said layer 3. The layers can be fastened to one another by way of spot or line welding, optionally in combination with a local compression of the kraft paper and the PLA-layer.

Figure 3:
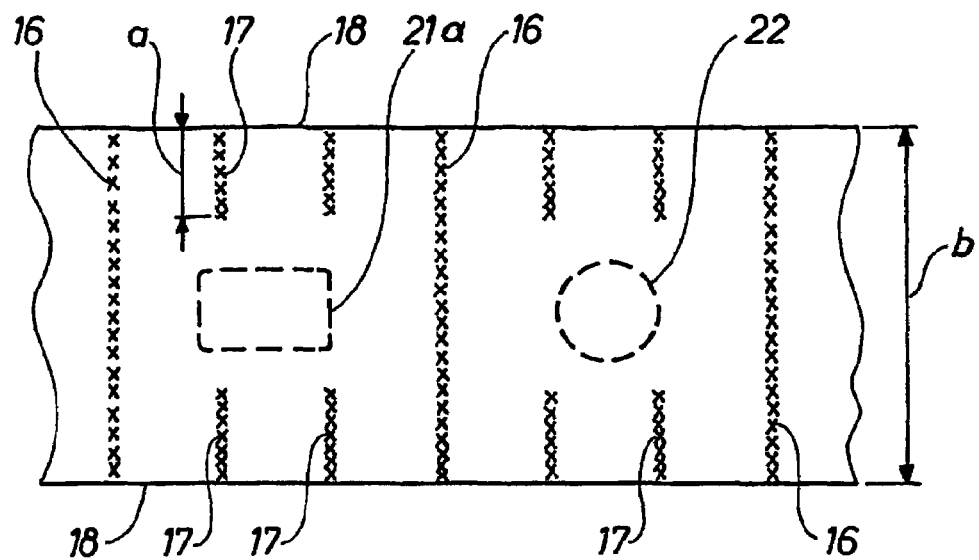
FIG. 3 is a front view of a portion of a third embodiment of the seed tape.

As shown in FIG. 3, each germinating unit can be delimited by two spaced transverse spot or line weldings 16, and at least two relatively short auxiliary weldings 17 can be provided between said spot or line weldings. These auxiliary weldings 17 project inwards from each side edge 18 of the seed tape and are of a length a of 0.05 to 0.20, preferably 0.1 to 0.15, especially 0.12 times the width b of the seed tape.

When the flexible non-woven layer 3 is made of PLA, the spot or line weldings 16 can be provided at a temperature of 70 to 110° C.

The fibres of the non-woven layer 3 can be of a length of 5 to 9 cm, preferably 6 to 8 cm, and a thickness of 0.1 to 0.2 mm.

The water-absorbing material 8 can be made of silica particles instead of the above SAP-grains or fibres.

Figure 2:
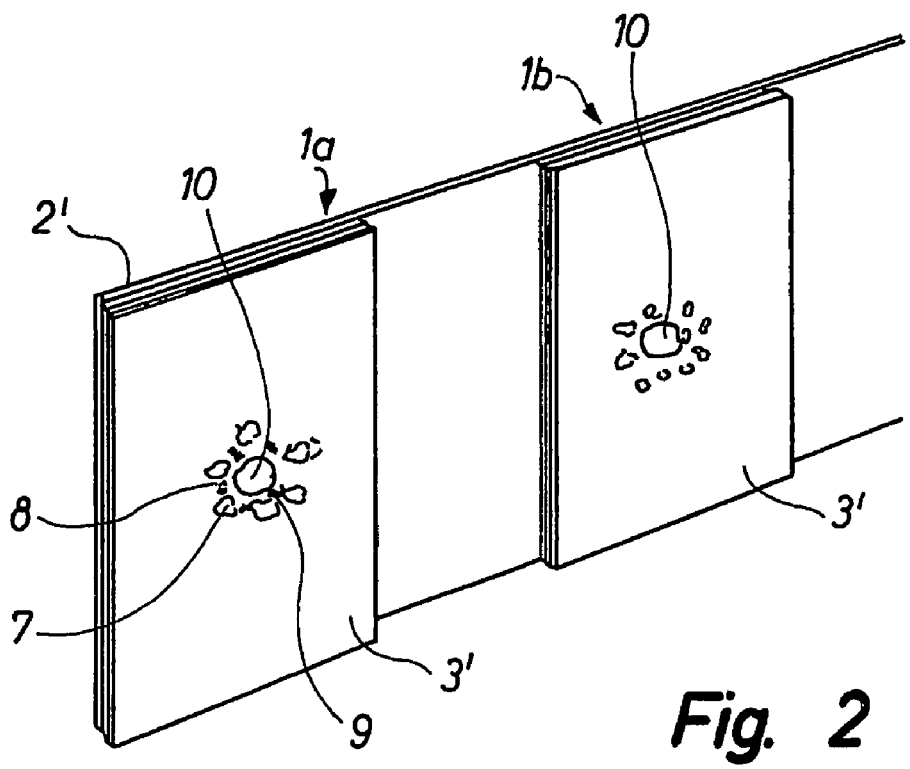
FIG. 2 is a perspective view of a portion of a second embodiment of the seed tape.

As shown in FIG. 2, the seed tape can include a carrier strip 2', and the biodegradable, gas-permeable non-woven layer can be fastened to said carrier strip in form of a row of pockets 3' of non-woven polylactide (PLA), said pockets preferably being arranged at an equidistant distance.

The flexible non-woven PLA-layer 3 can have a weight of 10 to 40 g/m$^2$, preferably 14 to 25 g/m$^2$, especially 22 g/m$^2$. The paper strip 2 can include fibres of PLA, preferably of a fibre length of 4 to 7 mm.

Figure 4:
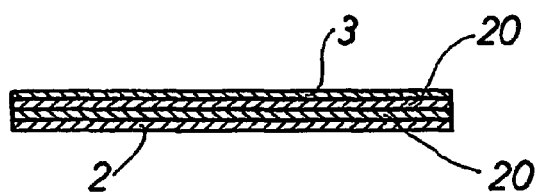
FIG. 4 is a cross sectional view of an embodiment of the seed tape including separating layers.

As shown in FIG. 4, at least one thin separating layer 20 of biodegradable film can be placed in parallel to the biodegradable flexible non-woven layer 3, said thin separating layer optionally being a semi-permeable film, preferably of PLA, gelatine or cellulose (cellophane®) and preferably of a thickness of 20 to 75 μm, especially 30 to 50 μm. Thus the separating layers 20 separate the carrier, the adjuvant and the water-absorbing additive. As the separating layers are gradually disintegrated, the above materials are released.

Figure 5:
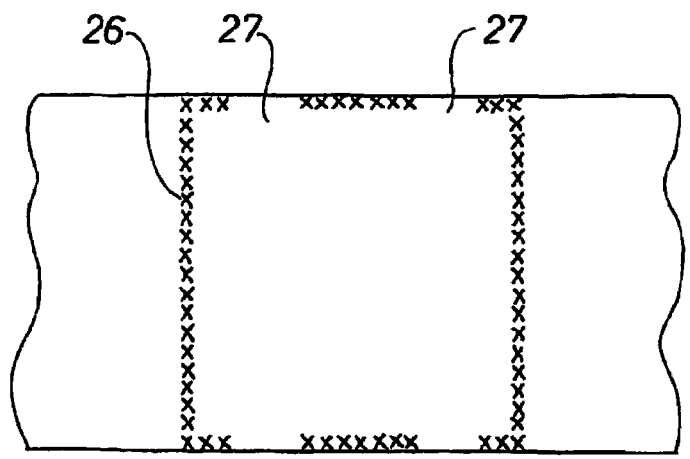
FIG. 5 is a front view of a portion of a fourth embodiment of the seed tape.

When the seeds are sugar beet seeds, each germinating unit can be delimited by a circumferential welded seam 26, cf. FIG. 5, which is optionally locally interrupted in order to provide openings 27 allowing radicles and seedlings to penetrate from each seed.

Figure 6:
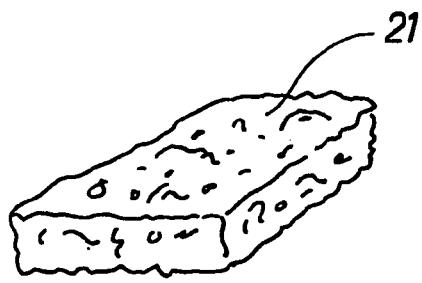
FIG. 6 is a perspective view of a piece according to the invention.

As shown in FIG. 6, the mixture of carrier 7, water-absorbing additive 8 and optionally adjuvant 9 can be compressed into a small piece 21 which, if desired, can also include the seed or the seeds 10.

Figure 9:
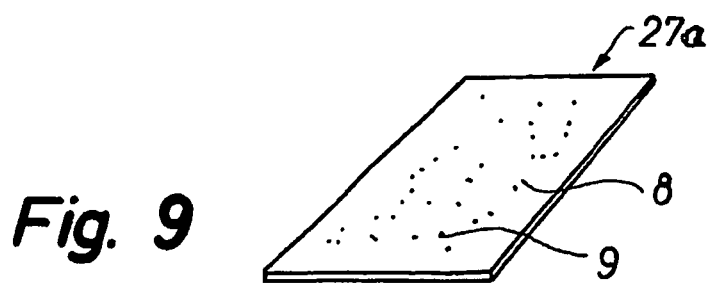
FIG. 9 is a perspective view of a blotting paper piece according to the invention.
Figure 10:
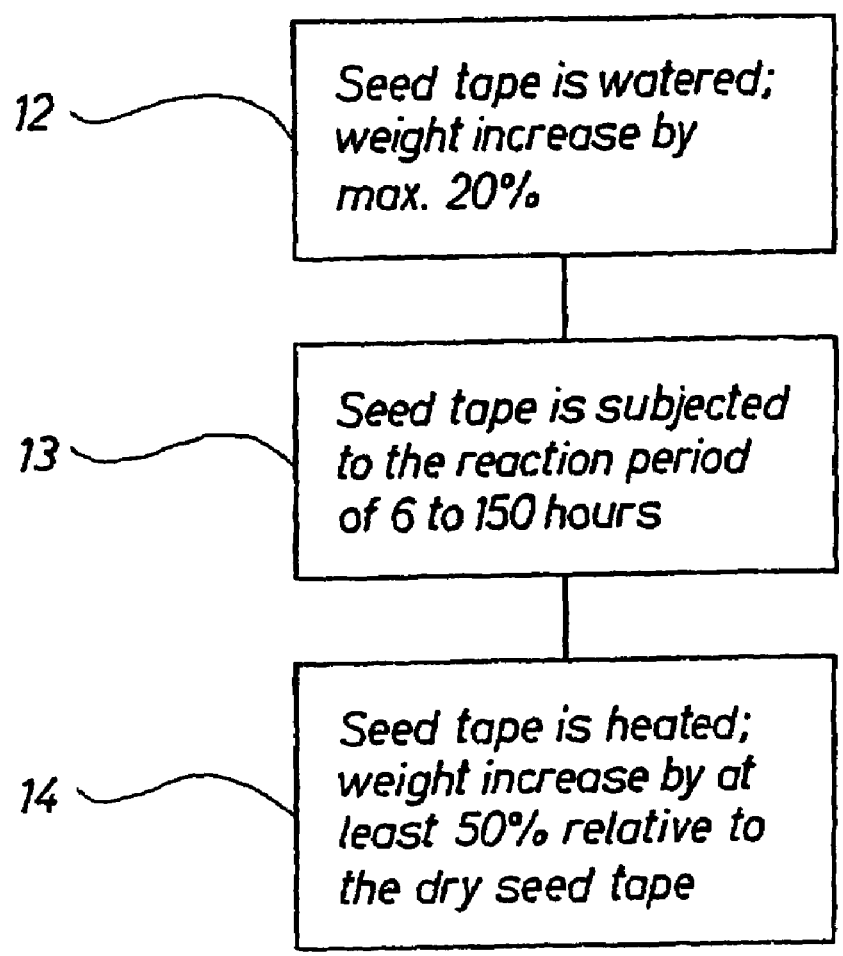
FIG. 10 illustrates a diagram showing a method of germinating the seed tape according to the invention.

The pieces 21a (FIG. 3) or 27a (FIG. 9) can be provided by placing paper pulp, SAP-crystals and grains of carrier 7 and adjuvant 9 by means of air on for instance the prepunched surface of a suction cylinder not shown.

Figure 7:
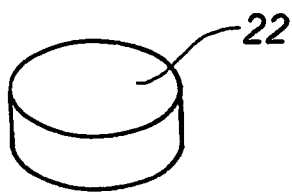
FIG. 7 is a perspective view of a capsule according to the invention.

The adjuvant 9, such as pesticides, can, if desired, be placed in a small closed capsule 22, cf. FIG. 7, inserted in each germinating unit in order to allow a "slow release" of said pesticides.

Figure 8:
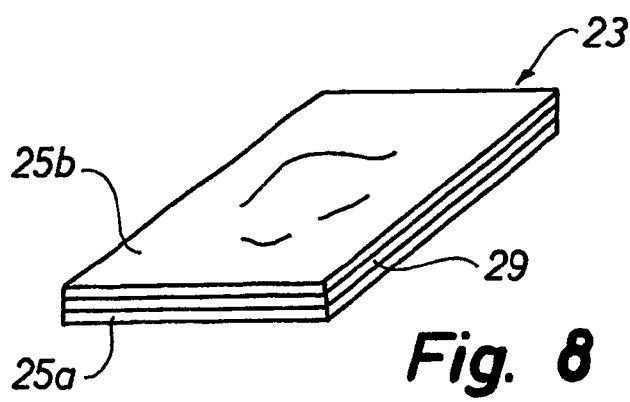
FIG. 8 is a perspective view of a piece according to the invention structured as a sandwich.

In addition, said piece can be constituted by a sandwich 23, cf FIG. 8, which is delimited by layers 25a, 25b of non-woven PLA on the outside and which on the inside contains the carrier 7, the adjuvant 9 and the water-absorbing additive 8 optionally in connection with the separating layers 29, said piece for instance being dimensioned substantially as a stamp.

The flexible non-woven PLA-layer 3 in the germinating unit 1a, 1b, 1c can present a suction capacity of 0 to 30 mm, for instance 5 to 15 mm, estimated according to the method indicated in H. J. Hannover and Sigurd Smith: Papirfabrikation ("Production of Paper") Julius Gjellerups Forlag 1934, page 277. The suction capacity is the height measured in mm to which said layer 3 can suck the water in 10 min, the layer 3 being present as a vertically suspended strip of the layer 3.

Furthermore it is possible that the water-absorbing additive or additives 8, such as SAP, and optionally adjuvants 9, such as pesticides, can be absorbed in or adhered to a blotting paper piece 27a optionally provided with a plastic coating, such as a PLA-coating, for a "slow release" of additive 8 and/or adjuvant 9. This blotting paper piece 27a can be placed inside each germinating unit 1a, 1b, 1c, cf. FIG. 3, and for instance result from a cutting off from a high speed produced roll of blotting paper, such as at 500 m/min, where the above water-absorbing additive and adjuvant, if any, is sucked into or glued onto said blotting paper.

The invention maybe modified in many ways without thereby deviating from the scope of the invention, as it appears from the attached claims. Thus, the strip 4 in the seed tape 1 can be replaced by a coating, which is placed for instance on top of the non-woven layer 3, whereby the seed 10, the carrier 7, the adjuvant 9 and the additive 8 are then retained against the layer 3 by said coating. The latter option is, however, not shown.

It should be noted that the seed tape according to the invention has nothing to do with covering materials or strips containing seeds and adjuvants, and which are intended to be placed on the bare surface of the ground, especially in areas suffering from difficult growth conditions. As far as the seed tape according to the invention or portions thereof is concerned the seed tape or seed tapes are placed either horizontally or vertically at a suitable depth below the surface of the ground.

The flexible non-woven layer 3 of biodegradable, gas-permeable material can also be a polymer, for instance a polyester or another oil-based polymer; it can optionally be an aliphatic-aromatic polycondensation copolymer derived from dipidic terephtalic acid and butanediol.

The invention claimed is:

1. A seed tape including successively arranged germinating units, and which further includes at least one carrier strip made of polylactide (PLA) as well as at least one layer of biodegradable, gas-permeable material which is flexible and non-woven and arranged on said carrier strip, whereby each germinating unit includes a mixture of carrier, at least one additive which is water-absorbing and one or more seeds, characterized in that the layer of biodegradable, gas-permeable material is flexible and non-woven, and is made of polylactide (PLA) or a material including said polylactide, or is made of rayon, viscose or polylactide plus starch.

2. A seed tape as claimed in claim 1, characterized in that super absorbing polymer (SAP) grains or SAP fibres are arranged around and adjacent the seed, said SAP grains or SAP fibres being retained by means of an adhesive effect resulting from an ultrasound or heat treatment of the non-woven material.

3. A seed tape as claimed in claim 1, characterized in that the non-woven PLA material presents a needle structure and is structured as a sandwich with three crossed layers, where the middle layer includes relatively thin fibres and the two outer layers include fibres being thicker than the fibres of the middle layer.

4. A seed tape as claimed in claim 2, in which the SAP grains or SAP fibres are retained adjacent the seed, characterized in that said grains or fibres are retained by being glued onto the non-woven layer by means of biodegradable natural glue, such as a starch, gelatine or sugar-based glue.

5. A seed tape as claimed in claim 1, characterized in that each germinating unit is delimited by two spaced transverse spot or line weldings, and that at least two relatively short auxiliary weldings are provided between the spot or line weldings, said auxiliary weldings projecting inwards from side edges of each seed tape and being of a length of 0.05 to 0.20 times the width of the seed tape.

6. A seed tape as claimed in claim 5, characterized in that the spot or line weldings are provided at a temperature of 70 to 110° C.

7. A seed tape as claimed in claim 3, characterized in that the fibres of each non-woven layer are of a length of 5 to 9 cm.

8. A seed tape as claimed in claim 1, characterized in that the biodegradable, gas-permeable, flexible, non-woven layer is formed by a row of pockets of non-woven polylactide (PLA) fastened to the carrier strip at an equidistant distance, and where each pocket includes a seed.

9. A seed tape as claimed in claim 1, characterized in that the flexible non-woven PLA layer is of a weight of 10 to 40 g/m$^2$.

10. A seed tape as claimed in claim 1, and where the seeds are sugar beet seeds, characterized in that each germinating unit is delimited by a circumferential welded seam, which is locally interrupted in order to provide an opening through which radicles and seedlings can advance.

11. A seed tape as claimed in claim 1, characterized in that it contains pieces produced by placing cellulose fibres, SAP-crystals and grains of carrier and adjuvants on the surface of a suction cylinder by means of air.

12. A seed tape as claimed in claim 11, characterized in that the adjuvants are placed in a small capsule in each germinating unit.

13. A seed tape as claimed in claim 1, characterized in that the flexible non-woven PLA-layer presents a suction capacity of 0 to 30 mm.

14. A seed tape as claimed in claim 1, characterized in that the water-absorbing additive or additives, include a super absorbing polymer (SAP), and adjuvants including pesticides, and can be absorbed in or adhered to a blotting paper piece provided with a plastic coating, for a slow release of additive and/or adjuvant, said blotting paper piece being placed inside each germinating unit and resulting from a cutting off from a high speed-produced roll of blotting paper at 500 m/min, where the above water-absorbing additive and adjuvant, if any, are absorbed into or glued onto said blotting paper piece.

15. A seed tape as claimed in claim 1, wherein the layer is locally interrupted a short distance along the seed tape, each germinating unit including an adjuvant.

16. A seed tape according to claim 13 wherein the suction capacity is 5 to 15 mm.

* * * * *